(12) United States Patent
Dyrla et al.

(10) Patent No.: US 9,038,939 B2
(45) Date of Patent: May 26, 2015

(54) METHOD OF CONTROLLING A GROUP OF ENGINES, AND AN AIRCRAFT

(75) Inventors: Nadine Dyrla, Bouc Bel Air (FR);
Alban Corpron, Salon de Provence (FR); Emmanuel Joubert, Issy les Moulineaux (FR); Hichem Smaoui, Paris (FR)

(73) Assignees: Airbus Helicopters, Marignane Cedex (FR); EADS (European Aeronautic Defence And Space Company EADS France), Paris (FR)

(*) Notice: Subject to any disclaimer, the term of this patent is extended or adjusted under 35 U.S.C. 154(b) by 479 days.

(21) Appl. No.: 13/549,893

(22) Filed: Jul. 16, 2012

(65) Prior Publication Data
US 2013/0184958 A1 Jul. 18, 2013

(30) Foreign Application Priority Data
Jul. 18, 2011 (FR) .................................. 11 02225

(51) Int. Cl.
| | |
|---|---|
| B64D 31/00 | (2006.01) |
| B64C 27/12 | (2006.01) |
| B64D 41/00 | (2006.01) |
| B60K 6/00 | (2006.01) |
| B64C 27/04 | (2006.01) |
| B64D 27/24 | (2006.01) |
| B64D 31/06 | (2006.01) |
| G05D 1/00 | (2006.01) |
| B64D 27/02 | (2006.01) |

(52) U.S. Cl.
CPC . *B64D 31/00* (2013.01); *B60K 6/00* (2013.01); *B64C 27/04* (2013.01); *B64D 27/24* (2013.01); *B64D 31/06* (2013.01); *G05D 1/0005* (2013.01); *B64D 2027/026* (2013.01); *Y02T 50/64* (2013.01)

(58) Field of Classification Search
None
See application file for complete search history.

(56) References Cited

U.S. PATENT DOCUMENTS

| | | | |
|---|---|---|---|
| 3,963,372 A | | 6/1976 | McLain |
| 4,500,966 A | * | 2/1985 | Zagranski et al. ............ 701/116 |

(Continued)

FOREIGN PATENT DOCUMENTS

| | | |
|---|---|---|
| DE | 102007017332 A1 | 10/2008 |
| EP | 2327625 A1 | 6/2011 |

(Continued)

OTHER PUBLICATIONS

Search Report and Written Opinion; Application No. FR 1102225; dated Mar. 9, 2012.

*Primary Examiner* — Helal A Algahaim
*Assistant Examiner* — Paul Castro
(74) *Attorney, Agent, or Firm* — Brooks Kushman P.C.

(57) ABSTRACT

A method of controlling a group (2) of engines developing a necessary power ($W_{nec}$) for driving a rotor (3), said group (2) of engines having at least one electrical member (4), electrical energy storage means (5), and a first number n of engines (6) that is greater than or equal to two. A processor unit (10) executes instructions for evaluating a main condition as to whether the group of engines can develop the necessary power while resting one engine, and if so for resting one engine and accelerating a second number engines not at rest, and for causing the electrical member to operate in motor mode, if necessary, the electrical member operating temporarily in electricity generator mode when the storage means are discharged.

20 Claims, 4 Drawing Sheets

(56) References Cited

U.S. PATENT DOCUMENTS

| | | |
|---|---|---|
| 8,201,414 B2 | 6/2012 | Haehner |
| 2009/0186320 A1* | 7/2009 | Rucci et al. ............... 434/33 |
| 2010/0013223 A1 | 1/2010 | Certain |
| 2010/0058731 A1 | 3/2010 | Haehner |
| 2010/0064689 A1 | 3/2010 | Reinhardt |
| 2011/0121127 A1 | 5/2011 | Certain |
| 2012/0227389 A1* | 9/2012 | Hinderks ................. 60/317 |
| 2014/0252158 A1* | 9/2014 | Schaeffer ................ 244/17.13 |
| 2014/0365039 A1* | 12/2014 | Schaeffer et al. ............ 701/3 |

FOREIGN PATENT DOCUMENTS

| | | |
|---|---|---|
| FR | 2914697 A1 | 10/2008 |
| FR | 2933910 A1 | 1/2010 |

\* cited by examiner

METHOD OF CONTROLLING A GROUP OF ENGINES, AND AN AIRCRAFT

CROSS REFERENCE TO RELATED APPLICATIONS

This application claims priority to FR 11 02225 filed on Jul. 18, 2011, the disclosure of which is incorporated in its entirety by reference herein.

BACKGROUND OF THE INVENTION (1) Field of the Invention

The present invention relates to a method of controlling a group of engines driving a rotor, such as a rotor for providing a rotorcraft with lift and possibly also propulsion. Furthermore, the invention relates to an aircraft implementing the method.

Under such circumstances, the invention lies in the technical field of groups of aircraft engines, and particularly groups of engines for rotary wing aircraft, such a group comprising a plurality of engines and at least one electric motor.

(2) Description of Related Art

Conventionally, a rotary wing aircraft includes in principle a group of engines comprising at least one fuel-burning engine such as a piston engine or a turbine engine. A gearbox connects the group of engines to the main advance and lift rotor: this is referred to as the main gearbox (MGB).

Temperature limits for an engine and torque limits for a main gearbox serve to define an operating envelope for each engine that covers three normal utilization ratings:

a takeoff rating corresponding to a level of torque for the main gearbox and a level of heating for the engine that can be accepted for a limited length of time without significant degradation, this takeoff rating being defined by a maximum takeoff power (max TOP) and by a duration for using this maximum takeoff power that is generally of the order of five minutes;

a maximum continuous power (MCP) rating that corresponds to about 90% of the maximum takeoff power max TOP and to a duration of utilization of this maximum continuous power that is generally unlimited; and an idling rating for minimizing fuel consumption, with the engine nevertheless continuing to keep running while idling.

By way of example the idling rating may be used to keep the speed at which a moving member of the engine moves at a given value.

For example, the speed of rotation of a gas generator may be maintained for a turbine engine. The specific value is set by the manufacturer, in particular for optimizing the fuel consumption of the engine and for ensuring that the engine continues to run independently.

As a variant, for a turbine engine having a free turbine, it is possible to control the speed of rotation of the free turbine.

Furthermore, an aircraft and in particular a rotary wing aircraft may have one or more engines. For example, three categories of rotorcraft may be distinguished.

The first category relates to single-engine rotorcraft where there is only one engine, a piston engine or a turbine engine. In the absence of any other source of power, it is not possible to share the supply of power between different sources.

The second category relates to twin-engined rotorcraft where two engines are provided, two piston engines or two turbine engines. Those engines are controlled jointly so that each supplies half of the power required at any moment in flight, with this required power being referred to below as the "necessary" power.

Alternatively, the two engines may be controlled so that some of their operating parameters are kept equal, such as for example the speed of rotation of a gas generator or the control temperature in the context of fuel-burning engines.

Regulating engines in that way does not enable them to operate in asymmetrical manner, except in the event of one of them failing. In particular, deliberately stopping one of the engines in flight or causing it to idle is prohibited for safety reasons.

A third category relates to rotorcraft having three engines and they are similar in terms of operation to twin-engine aircraft.

Thus, on a rotorcraft having a plurality of engines, the trend is to share the amount of power that needs to be developed fairly between the various engines.

However, sharing power in that way can lead to engines being used in operating ranges that have low energy efficiency.

It should be observed that the specific fuel consumption of a turbine engine drops with increasing power developed by that engine up to an optimum point referred to as the "adaptation point", which is generally close to the maximum takeoff power max TOP. Surprisingly, the greater the level of power developed by a turbine engine, the better its specific consumption, up to close to the maximum takeoff power max TOP.

Under such circumstances, sharing the necessary power in equivalent manner between a plurality of engines in a group of engines tends to cause all of the engines to operate in operating ranges that are not optimized from the point of view of energy efficiency.

The duration of a flight or the distance that can be traveled by the aircraft are thus reduced.

A rotorcraft has two characteristic forward speeds:

a first speed is known as "velocity of best endurance" (Vbe) and it corresponds to the horizontal speed that provides the rotorcraft with maximum endurance to enable it to fly for as long as possible with a given quantity of fuel; and a second speed known as the "velocity of best range" (Vbr) corresponding to the horizontal speed that provides the rotorcraft with a maximum distance that it can travel in order to enable it to fly as far as possible with a given quantity of fuel.

Nevertheless, it is found for example that the first speed can generally be achieved by a rotorcraft having two or three engines by using a single engine delivering power that is less than or equal to the maximum continuous power MCP.

It can thus be understood that when flying a rotorcraft at this first speed while running all of the engines, each engine is called on to develop a relatively moderate level of power, thereby giving rise to medium energy efficiency.

Under such circumstances, it is possible to envisage stopping one of the engines in flight in order to improve energy efficiency. Nevertheless, although stopping an engine is possible, it should be observed that the flight envelope is then generally very restricted.

For example, it is observed that it is often difficult or even impossible to fly at the second speed using only one engine on a twin-engined rotorcraft.

Consequently, performing long-range missions on one engine requires the forward speed to be reduced. Under such circumstances, the saving in fuel consumption achieved by optimizing use of the turbine engine can be countered by a reduction in the energy performance of the rotorcraft, since the rotorcraft is no longer operating at the second speed that is optimum for this type of mission. Furthermore, travel time may be lengthened significantly.

Under such circumstances, a flight made to cover a long distance must advantageously be performed while using all of the engines, even though that means using them in an operating range that is not optimized from an energy efficiency point of view.

It should be observed that the prior art includes document FR 2 914 697 relating to a device for providing assistance during transient stages in which an aircraft is accelerating or decelerating.

That document FR 2 914 697 describes a turbine engine having a gas generator, a free turbine driven in rotation by the stream of gas generated by the gas generator, and an auxiliary motor.

In order to avoid a known "pumping" phenomenon, an engine manufacturer generally provides a so-called "pumping" margin that limits the acceleration capacity of the turbine engine. That document FR 2 914 697 relates to a helicopter turbine engine presenting acceleration capacity that is optimized, while still having the same pumping margin as a prior art turbine engine. The turbine engine then includes an auxiliary motor coupled to a shaft of the gas generator in order to supply an additional quantity of rotary kinetic energy to the shaft during a stage in which the turbine engine is accelerating.

Document FR 2 933 910 describes a hybrid installation having at least one engine and at least one electric motor.

Document DE 10 2007 017332 describes an aircraft having a propeller, an internal combustion engine having a drive take-off enabling the propeller to be driven, and an electrical machine, the internal combustion engine co-operating with the electrical machine.

The invention thus provides a method of controlling a group of engines of an aircraft developing a necessary power for driving a rotor, the group of engines being provided with at least one electrical member connected to electrical energy storage means and with a first number n of fuel-burning engines greater than or equal to two. The electrical member may then comprise at least one electric motor capable of operating in an electric motor mode and in an electricity generator mode, the storage means possibly comprising at least one battery.

BRIEF SUMMARY OF THE INVENTION

An object of the present invention is thus to propose a method of controlling a group of engines including at least one electrical member and at least two engines, e.g. for the purpose of reaching a remote destination by optimizing the overall energy efficiency of the aircraft.

Each engine may also develop continuous power without limitation on duration at a continuous rating, such as the maximum continuous power MCP as explained above.

The method is remarkable in particular in that a processor unit executes stored instructions for evaluating a main condition in which the group of engines can develop the necessary power while resting one engine, and when the main condition is satisfied, for:

resting one engine, and accelerating the engines not at rest, i.e. accelerating a second number n−1 of engines not at rest equal to said first number n minus one in order to develop at most a threshold power with the engines, the threshold power being reached when each engine that is not at rest is developing said continuous power.

For example, the group of engines has a first number of engines equal to two. When both of the engines are developing the continuous power, the total power developed by the first number of engines is said to be the "optimum" power and is equal to twice the continuous power in this example.

A second number of engines that is one less than the first number is then capable of developing a so-called "threshold" power with each of those engines developing said continuous power.

Thus, for a group of engines having a first number of engines equal to two, the second number is equal to the first number minus an unity, in other words one. The "threshold" power is then in fact equal to the continuous power in this example.

Furthermore, the electrical member may develop at most a so-called "maximum" power when operating in motor mode. Furthermore, when the main condition is satisfied, the processor unit executes stored instructions to cause the electric motor to operate in motor mode if the processor unit finds that the main condition is satisfied while causing the electrical member to operate in motor mode and causing the second number of engines to operate together therewith, the electrical member being caused temporarily to operate in electricity generator mode when the storage means are discharged.

It should be observed that the term "resting one engine" is used to mean an operation seeking either to stop the engine or else to cause the engine to operate under idling conditions during which the engine continues to run while minimizing the amount of fuel the engine consumes.

Thus, resting an engine is generally prohibited in the prior art while in flight except under circumstances in which the engine has failed or while performing a training flight, since the other engines may not suffice to carry out the mission.

However, by combining resting one engine with accelerating other engines and possibly other supplying additional power generated by the electrical member, it becomes possible to continue a mission under acceptable safety conditions.

The aircraft, which may be of the rotary wing type, for example, may then operate in an optimized flight mode having a succession of sequences, including:

resting one engine, possibly while running the electrical member to compensate for the lack of power from the engine(s) not at rest up to a certain level of discharge for the storage means; and switching the electrical member from electric motor mode to an electricity generator mode in order to electrically recharge the storage means, with it being possible to re-engage the engine that was at rest during this stage.

It should be observed that each sequence may determine which engine to rest in application of a predetermined cycle, so that two distinct engines end up with similar total durations at rest and similar numbers of returns to delivering power. Thus, the method does not give rise to asymmetry in utilization and thus in deterioration of the engines.

This mode of operation makes it possible to improve the overall efficiency of the power plant.

In particular, this mode of operation enables the electric motor to provide the aircraft with the additional power needed to maintain the aircraft at a speed with optimized energy efficiency, i.e. with improved energy efficiency. It becomes possible:

to run the engine(s) not at rest at the most favorable efficiency point; and to perform a flight at a third speed Vhy corresponding to the maximum speed that can be reached with one engine at rest and an electrical member operating in motor mode while not degrading or while improving the energy performance of the helicopter.

In particular, depending on the dimensioning of the electrical member, it is possible to obtain:

a first hybrid level that enables a third speed Vhy to be obtained that is substantially identical to the second speed Vbr that can be obtained only by using all of the engines, but with a fuel saving per kilometer and per hour, the third speed Vhy possibly being determined so as to give rise to a fuel consumption per kilometer that is equivalent to the minimum fuel consumption per kilometer that can be obtained while using fuel-burning engines only, with one engine at rest;

a second hybrid level that makes it possible to obtain a third speed Vhy equal to the second speed Vbr while increasing fuel saving per kilometer for unchanging fuel consumption per hour compared with the first hybrid level; and a third hybrid level that makes it possible to obtain a third speed Vhy that is faster than the second speed Vbr, the third hybrid level serving to increase the speed of the helicopter above the "conventional" second speed Vbr for unchanging fuel consumption per hour relative to the second hybrid level, thereby reducing fuel consumption per kilometer.

Consequently, when designing the aircraft, a manufacturer decides on the third speed Vhy and then dimensions the electrical member and the electricity storage means accordingly. The third speed Vhy that is selected may then depend on a compromise between:

the fuel saving achieved by increasing flying speed with one engine idling;

the on-board weight required by the hybrid system including the weight of the electrical member and the weight of the storage means, in particular; and matching the characteristic speeds of the aircraft with the requirements of the operator.

The method may also present one or more of the following characteristics.

For example, the processor unit evaluates whether the aircraft is in a first configuration in which the necessary power is less than or equal to the threshold power, or in a second configuration in which the necessary power is greater than the threshold power but less than or equal to the sum of the maximum power plus the threshold power, or in a third configuration in which the necessary power is greater than the sum of the maximum power plus the threshold power. The main condition is then satisfied if:

a first secondary condition in which the necessary power developed by the group of engines is less than or equal to said sum of the maximum power plus the threshold power is satisfied in said first and second configurations; and when the necessary power is greater than the threshold power, if a second secondary condition is satisfied that the storage means contain an amount of electrical charge greater than a minimum threshold.

As a result, an engine is rested in particular either if the first secondary condition is satisfied and if the storage means are charged, or else if the first secondary condition is satisfied and if the necessary power is greater than the threshold power independently of the level of charge in the storage means.

In another aspect, each engine not at rest may develop the same power in order to optimize damage to the engines.

Furthermore, if the necessary power is less than or equal to the threshold power, when said first secondary condition is satisfied, a strategy is applied as selected from a list including at least one of the following strategies.

In a first strategy a) relating to a first implementation, during a "generic" mode of operation, the electrical member is not used, each engine not at rest being accelerated so that it individually supplies power equal to the necessary power divided by the second number:

$$W_{ENGi} = W_{nec}/(n-1)$$

where "$W_{ENGi}$" represents the power developed by each engine not at rest, "$W_{nec}$" represents the necessary power, "/" represents the division sign, and "n−1" represents the second number, "n" representing the first number.

In a second strategy b) relating to a second implementation, during an "endurance" mode of operation seeking to optimize flight duration, the electrical member is operated in motor mode at the maximum power, each engine not at rest individually developing power equal to the difference between the necessary power and the maximum power divided by the second number, i.e.:

$$W_{ENGi} = (W_{nec} - W_{elec\_max})/(n-1)$$

where "$W_{ENGi}$" represents the power developed by each engine not at rest, "$W_{nec}$" represents the necessary power, "$W_{elec\_max}$" represents the maximum power, "/" represents the division sign, and "n−1" represents the second number, "n" representing the first number.

In a third strategy c) relating to a third implementation, during a "long-distance" mode of operation seeking to optimize the distance that can be traveled in flight, each engine not at rest individually developing power equal to the difference between the necessary power and the electrical power generated by the electrical member divided by the second number, i.e.:

$$W_{ENGi} = (W_{nec} - W_{elec})/(n-1)$$

where "$W_{ENGi}$" represents the power developed by each engine not at rest, "$W_{nec}$" represents the necessary power, "$W_{elec}$" represents the electrical power, "/" represents the division sign, and "n−1" represents the second number, "n" representing the first number.

Under such circumstances, the electrical member is caused to operate in motor mode at an electrical power equal to the minimum of firstly the product of the necessary power multiplied by a correction term, and secondly said maximum power, in accordance with the following relationship, i.e.:

$$W_{elec} = \min[W_{nec} \cdot (1 - Ck_{target}/Ck_{n-1}); W_{elec\_max}]$$

where "$W_{elec}$" represents the power developed by the electrical member, "$W_{nec}$" represents the necessary power, "$1 - Ck_{target}/CK_{n-1}$" represents said correction term, "$Ck_{target}$", represents a predetermined target fuel consumption per kilometer, "$Ck_{n-1}$" represents a fuel consumption per kilometer corresponding to the consumption per kilometer obtained with one engine at rest and with the engines not at rest supplying the necessary power when the necessary power is less than the threshold power, or supplying the threshold power when the necessary power is greater than or equal to the threshold power, "$W_{elec\_max}$" represents the maximum power, and "min" represents the minimum of the two expressions contained in the square brackets and separated by a semicolon.

Furthermore, and independently of the implementation, in the first configuration, when the first secondary condition is satisfied while the second secondary condition is not satisfied, the processor unit executes stored instructions to cause the electrical member to operate in electrical generator mode so as to recharge the storage means with electrical energy.

Thus, when the necessary power is equal to the threshold power, the storage means are recharged electrically by running all of the engines, each engine developing power equal to the sum of the necessary power plus a charging power divided by the first number, i.e.:

$$W_{ENGi} = (W_{nec} + W_{charge})/(n)$$

where "$W_{ENGi}$" represents the power developed by each engine not at rest, "$W_{nec}$" represents the necessary power, "$W_{charge}$" represents the charging power, "/" represents the division sign, and "n" represents the first number.

Furthermore, the charging power is equal to the minimum of firstly the difference between an optimum power developed by the first number of engines each operating at the continuous power and the necessary power, and secondly the maximum power, i.e.:

$$W_{charge}=\min[MCP_n-W_{nec}; W_{elec\_max}]$$

where "$W_{charge}$" represents the charging power, "$W_{nec}$" represents the necessary power, "$MCP_n$" represents the optimum power, "$W_{elec\_max}$" represents the maximum power, and "min" represents the minimum of the two expressions contained in the square brackets and separated by a semicolon.

In contrast, when the necessary power is less than the threshold power, the storage means are recharged electrically while resting an engine and running a second number of engines, each engine not at rest developing power equal to the sum of the necessary power plus a charging power divided by the second number, i.e.:

$$W_{ENGi}=(W_{nec}+W_{charge})/(n-1)$$

where "$W_{ENGi}$" represents the power developed by each engine not at rest, "$W_{nec}$" represents the necessary power, "$W_{charge}$" represents the charging power, "/" represents the division sign, and "n−1" represents the second number, "n" representing the first number.

Under such circumstances, the charging power is equal to the minimum of firstly the difference between the threshold power developed by the second number of engines not at rest each operating at the continuous power and the required power, and secondly the maximum power, i.e.:

$$W_{charge}=\min[MCP_{n-1}-W_{nec}; W_{elec\_max}]$$

where "$W_{charge}$" represents the charging power, "$W_{nec}$" represents the necessary power, "$MCP_{n-1}$" represents the threshold power, "$W_{elec\_max}$" represents the maximum power, and "min" represents the minimum of the two expressions contained in the square brackets and separated by a semicolon.

In the second configuration, if the necessary power is greater than the threshold power but less than or equal to the sum of the maximum power plus the threshold power, when said main condition is satisfied, an option is applied that is selected from a list including at least one of the following options as a function of the implementation.

In a first option a') relating to the first and second implementations, each engine not at rest is accelerated so that it develops individually the continuous power, the electric motor being operated in motor mode to supply power equal to the difference between the necessary power and a thermal power, said thermal power being equal to the power developed together by said engines not at rest.

In a second option b') relating to the third implementation, with the electric motor being used in motor mode to supply electrical power, each engine not at rest is accelerated individually to supply power equal to the necessary power minus the electrical power divided by the second number, the electrical power being equal to the minimum of firstly the product of the necessary power multiplied by a correction term and secondly the maximum power, in accordance with the following relationship, i.e.:

$$W_{elec}=\min[W_{nec} \cdot (1-Ck_{target}/Ck_{n-1}); W_{elec\_max}]$$

where "$W_{elec}$" represents the power developed by the electrical member, "$W_{nec}$" represents the necessary power, "$1-Ck_{target}/CK_{n-1}$" represents said correction term, "$Ck_{target}$" represents a predetermined fuel consumption per kilometer, "$Ck_{n-1}$" represents a fuel consumption per kilometer corresponding to the consumption per kilometer obtained with one engine at rest and with the engines that are not at rest supplying the necessary power when the necessary power is less than the threshold power or the threshold power when the necessary power is greater than or equal to the threshold power, "$W_{elec\_max}$" represents the maximum power, and "min" represents the minimum of the two expressions contained in the square brackets and separated by a semicolon.

In contrast, independently of the implementation, when the storage means contain electrical charge below a minimum threshold, the storage means are recharged electrically by running all of the engines, each engine developing power equal to the sum of the necessary power plus a charging power divided by the first number, i.e.:

$$W_{ENGi}=(W_{nec}+W_{charge})/(n)$$

where "$W_{ENGi}$" represents the power developed by each engine not at rest, "$W_{nec}$" represents the necessary power, "$W_{charge}$" represents the charging power, "/" represents the division sign, and "n" represents the first number.

The charging power is then equal to the minimum of firstly the difference between an optimum power developed by the first number of engines each operating at continuous power and the required power and secondly the maximum power and secondly the maximum power, i.e.:

$$W_{charge}=\min[MCP_n-W_{nec}; W_{elec\_max}]$$

where "$W_{charge}$" represents the charging power, "$W_{nec}$" represents the necessary power, "$MCP_n$" represents the optimum power, "$W_{elec\_max}$" represents the maximum power, and "min" represents the minimum of the two expressions contained in the square brackets and separated by a semicolon.

In the third configuration, if the necessary power is greater than the sum of the maximum power plus the threshold power, a requirement may be evaluated in which the necessary power is less than the optimum power developed by the first number of engines, each operating at the continuous power.

For example, when the requirement is satisfied, or when the requirement is not satisfied and the storage means include an electric charge greater than a minimum threshold, the electrical member is not used, each engine being controlled to develop power equal to the quotient of the necessary power divided by the first number.

In contrast, when said requirement is not satisfied and said storage means include an electric charge less than or equal to a minimum threshold, said electric member is used in electricity generator mode, each engine developing power equal to the sum of the necessary power plus a charging power divided by the first number, i.e.:

$$W_{ENGi}=(W_{nec}+W_{charge})/(n)$$

where "$W_{ENGi}$" represents the power developed by each engine not at rest, "$W_{nec}$" represents the necessary power, "$W_{charge}$" represents the charging power, "/" represents the division sign, and "n" represents the first number.

The charging power is then equal to the minimum between the maximum power and the difference between an optimum power developed by the first number of engines each operating at the continuous power and the necessary power, i.e.:

$$W_{charge}=\min[MCP_n-W_{nec}; W_{elec\_max}]$$

where "$W_{charge}$" represents the charging power, "$W_{nec}$" represents the necessary power, "$MCP_n$" represents the optimum power developed by all of the engines operating at the first power, "$W_{elec\_max}$" represents the maximum power, and "min" represents the minimum of the two expressions contained in the square brackets and separated by a semicolon.

In another aspect, for safety reasons, it is possible to avoid resting any engine while hovering.

In addition to a method, the invention provides an aircraft having a group of engines developing a necessary power to drive a rotor, the group of engines being provided with at least one electrical member connected to electrical storage means and with a first number n of fuel burning engines greater than or equal to two, said electrical member being capable of developing a maximum power in motor mode.

The aircraft is remarkable in particular in that it includes a processor unit connected to the engines and to the electrical member, the processor unit being connected to determination means for determining said necessary power, the processor unit executing stored instructions in order to implement the method as described above.

This aircraft may optionally include at least one piece of equipment to be selected from a selection comprising at least:

strategy selection means for selecting a strategy to be applied if the necessary power is less than or equal to the threshold power, when the main condition is satisfied that the group of engines can develop the necessary power while resting one engine;

option selection means for selecting an option to be applied if the necessary power is greater than the threshold power but less than or equal to the sum of the maximum power and the threshold power, and if said main condition is satisfied;

tactical selection means for determining firstly which strategy to apply if the necessary power is less than or equal to the threshold power, and when the main condition is satisfied that the group of engines can develop the necessary power while resting one engine, and secondly an option to be applied if the necessary power is greater than the threshold power but less than or equal to the sum of the maximum power plus the threshold power, and if said main condition is satisfied; and inhibit means for inhibiting resting an engine, the inhibit means being capable of preventing the above-described control method being applied and being capable of causing the engines to accelerate to a power rating of said engines following application of said method.

Consequently, the means for selecting a strategy enable a pilot to apply a first strategy associated with a "generic" implementation, a second strategy associated with an implementation favoring the endurance of the aircraft, or a third strategy associated with an implementation favoring the distance that can be covered when the aircraft is in the above-mentioned first configuration.

Likewise, the means for selecting a strategy enable a pilot to apply a first option associated with a "generic" implementation, and also with an implementation favoring the endurance of the aircraft, or a second option associated with an implementation favoring the distance that can be traveled when the aircraft is in the second above-mentioned configuration.

By implementing two selection means, it is possible to favor distinct implementations as a function of the configuration in which the aircraft is to be found.

In a preferred variant, the means for selecting a strategy and the means for selecting an option are included in single tactical selection means.

Such tactical selection means may include a position corresponding to the "generic" implementation, a position corresponding to the implementation favoring the endurance of the aircraft, and a position corresponding to the implementation favoring the distance that can be traveled when the aircraft is in the second above-mentioned configuration.

Depending on the configuration in which the aircraft is flying, the processor unit implements the appropriate option or strategy.

BRIEF DESCRIPTION OF THE SEVERAL VIEWS OF THE DRAWINGS

The invention and its advantages appear in greater detail from the context of the following description of embodiments given by way of illustration and with reference to the accompanying figures, in which.

Elements that are shown in more than one of the figures are given the same references in each of them.

DETAILED DESCRIPTION OF THE INVENTION

Figure 1:
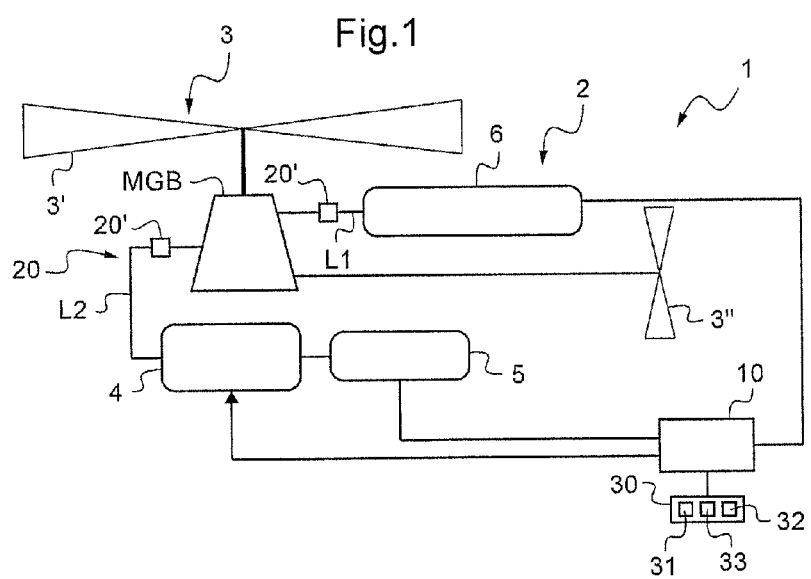
FIG. 1 shows an aircraft of the invention.

FIG. 1 shows an aircraft 1 having at least one rotor 3 contributing to its propulsion and/or lift, and possibly also to controlling the aircraft 1. By way of example, the aircraft 1 may be an aircraft having a rotary wing 3' and a tail rotor 3" for providing yaw control.

The aircraft 1 is also provided with a group of engines 2 or power plant driving a main gearbox (MGB) for power transmission, the main gearbox serving to put the rotors 3 into rotation.

The power plant 2 has a plurality of fuel burning engines of the piston engine type, or possibly of the turbine engine type. More precisely, the power plant 2 has a first number n of engines 6, where n is greater than or equal to two.

Each engine is defined to operate at at least one continuous power rating during which the engine develops a level of power continuously and without limit on duration, such as the maximum continuous power MCP. In addition, each engine may be designed for example to operate at an idling speed.

When each engine is developing its continuous power MCP, the first number n of engines together develop said optimum power $MCP_n$.

However, if one of the engines is at rest, i.e. either stopped or idling, then the power plant 2 makes use of only a second number n−1 of engines 6 that are not at rest for the purpose of driving the rotors 3, the second number n−1 being equal to the number n minus one. Under such circumstances, when each engine that is not at rest is developing its continuous power MCP, it can be seen that the second number n−1 of engines that are not at rest act together to develop a power $MCP_{n-1}$, referred to as the threshold power.

Furthermore, the power plant 2 includes an electrical member 4 connected to electricity storage means 5. The electrical member 4 is arranged in parallel with the engines 6, the engines 6 and the electrical member 4 being connected to the main gearbox via respective distinct first and second drives L1, L2.

While being powered electrically by the storage means 5, this electrical member 4 is capable of operating in electric motor mode in order to contribute to driving the main gearbox. The electrical member then develops at most electrical power referred to as "maximum power" $W_{elec\_max}$.

The electrical member 4 can also operate in electricity generator mode while being driven by the main gearbox in order to feed electricity to the storage means 5.

Furthermore, the aircraft 1 has a control device for controlling the power plant 2. This device includes a processor unit 10 for controlling the operation of the power plant 2 implementing a mode of managing the power plant 2 that seeks to optimize the operation of the power plant 2 by resting an engine 6.

The processor unit 10 is thus connected to the engines 6 and to the electrical member 4 in order to control their operation, the processor unit being connected to the storage means 5 in order to determine its level of electric charge.

For this purpose, the processor unit is also connected to conventional power determination means 20 for determining the necessary power $W_{nec}$, which determination means may include means 20' for measuring torque, these measurement means 20' being arranged between each engine of the power plant 2 and the main gearbox.

It should be observed that the control device may also include at least one optional piece of equipment 30 selected from a list comprising: at least one means for activating/deactivating said management mode of the type comprising inhibit means 33 for preventing an engine being put to rest; at least one strategy selection means 31; and/or at least one option selection means 32 defining various modes of implementing the invention.

The processor unit may thus include a calculation member and a memory, the calculation member executing instructions stored in said memory in order to implement the method explained with reference to FIGS. 2 to 6.

Figure 2:
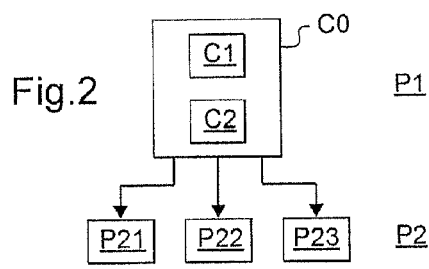
FIG. 2 is a diagram explaining the method of the invention.

With reference to FIG. 2, during an evaluation stage P1, the processor unit acts in real time to evaluate a main condition C0 as to whether the power plant 2 can develop the necessary power $W_{nec}$ that is required while resting an engine.

Figure 3:
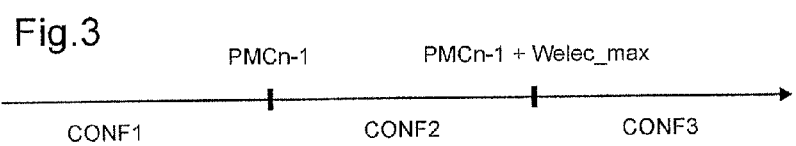
FIG. 3 is a diagram presenting possible flight configurations.

With reference to FIG. 3, three flight configurations can be distinguished.

In a first configuration CONF1, the necessary power $W_{nec}$ is less than or equal to the threshold power $MCP_{n-1}$.

In a second configuration CONF2, the necessary power $W_{nec}$ is greater than the threshold power $MCP_{n-1}$ but less than or equal to the sum of the maximum power $W_{elec\_max}$ and the threshold power $MCP_{n-1}$.

Finally, in a third configuration CONF3, the necessary power $W_{nec}$ is greater than the sum of the maximum power $W_{elec\_max}$ and the threshold power $MCP_{n-1}$.

The processor unit thus determines the configuration in which the aircraft is to be found.

As shown in FIG. 2, the processor unit finds that the main condition C0 is satisfied if a first secondary condition C1 and a second secondary condition C2 are both satisfied.

The first secondary condition is satisfied if the aircraft is in the first configuration CONF1 or the second configuration CONF2, i.e. when the necessary power $W_{nec}$ is less than or equal to the sum of the maximum power $W_{elec\_max}$ and the threshold power $MCP_{n-1}$.

Furthermore, the second secondary condition is satisfied when the storage means 5 contain electric charge greater than a minimum threshold, or when the storage means are electrically charged.

Under such circumstances, when the main condition is satisfied, the processor unit 10 implements a management stage P2 for causing the aircraft 1 to operate with optimized energy efficiency.

During a first step P21, the processor unit 10 causes one of the engines 6 to rest. The fuel consumption of that engine 6 is thus reduced.

During a second step P22, the processor unit 10 accelerates the engines 6 that are not resting. Thus, a second number n−1 of engines 6 of the power plant 2 is then used for driving the rotors 3. By accelerating these engines 6, their energy efficiency is optimized, since the specific consumption of an engine decreases with increasing power developed thereby.

During a third step P23, if the main condition is satisfied as a result of power being supplied by the electrical member 4, the processor unit requires this electrical member 4 to operate in motor mode.

It can be understood that the second secondary condition is not needed for the main condition to be satisfied when there is no requirement for such power to be supplied.

In addition, when the storage means are discharged, i.e. when the amount of electric charge stored is below a minimum threshold, the processor unit requires the electrical member to operate in generator mode, possibly requiring all of the engines 6 to be in operation.

It should also be observed that the first step P21, the second step P22, and the third step P23 may be performed together or in succession in an order predetermined by the manufacturer.

Figure 4:
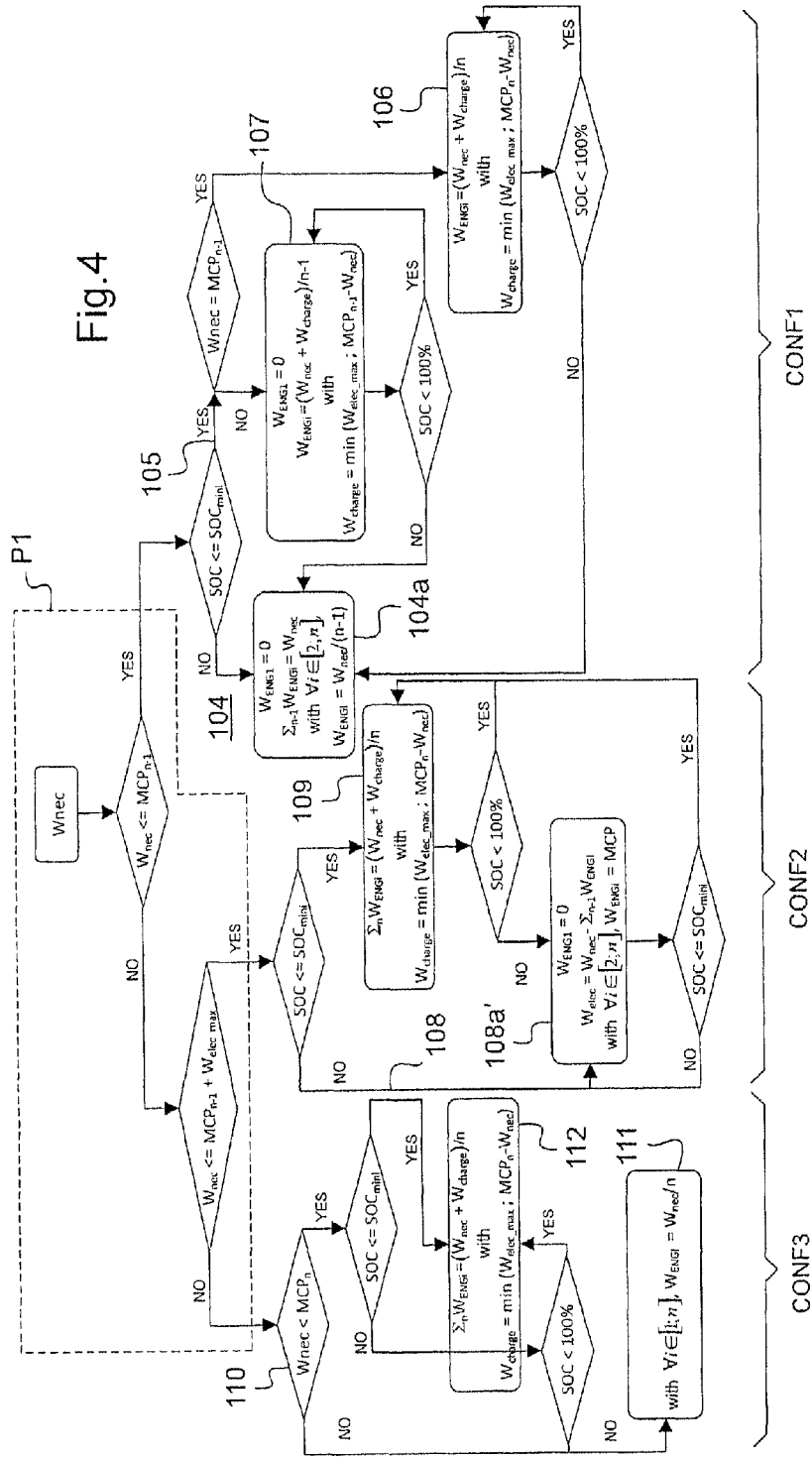
FIGS. 4 to 6 are diagrams explaining three implementations.
Figure 5:
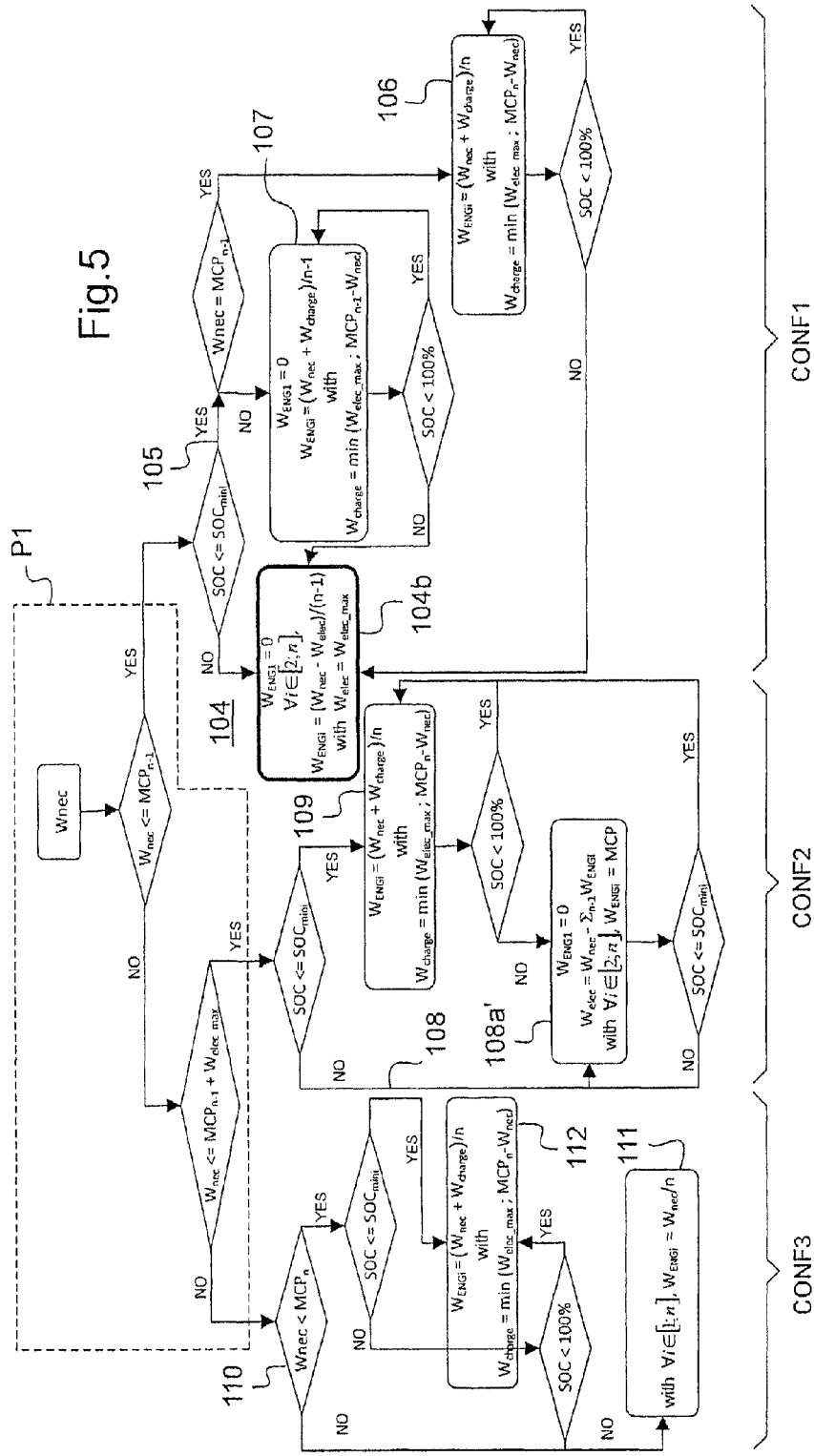
Figure 6:
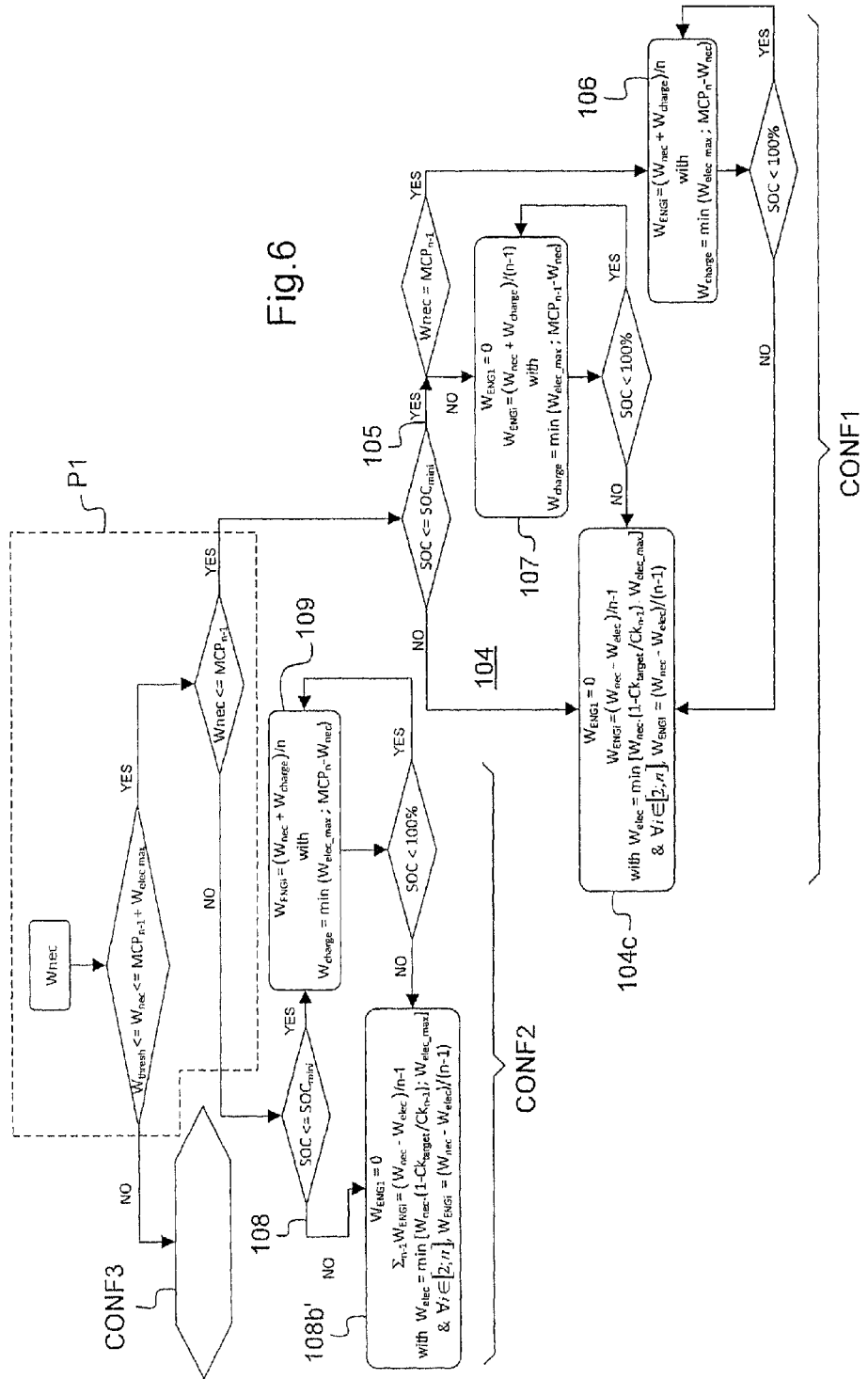

FIGS. 4 to 6 are diagrams explaining three distinct implementations.

Independently of the implementation, the processor unit determines the configuration in which the aircraft 1 is to be found during an evaluation stage P1.

In the first configuration CONF1, the main condition is satisfied independently of the level of charge in the storage means. As a result, the processor unit will in particular cause one of the engines to rest when the first secondary condition and the second secondary condition are both satisfied.

If the electric charge SOC is greater than a minimum threshold $SOC_{mini}$, a strategy 104 is implemented seeking to rest an engine 6.

In FIGS. 4 to 6, an engine at rest is represented by the expression "$W_{ENG1}=0$", regardless of whether the engine is stopped or idling, insofar as an engine at rest does not contribute to driving the rotors 3.

Depending on the implementation, the strategy is different.

With reference to FIG. 4, in a first strategy 104a, each engine that is not at rest is accelerated so that it individually delivers power equal to the necessary power $W_{nec}$ divided by the second number n−1 of engines not at rest. The power developed by each engine that is not at rest is written "$W_{ENG}$".

With reference to FIG. 5, in a second strategy 104b, the processor unit 10 causes the electrical member 4 to operate in motor mode at the maximum power $W_{elec\_max}$, each engine 6 that is not at rest individually developing a power equal to the difference between the necessary power $W_{nec}$ and the maximum power $W_{elec\_max}$ divided by the second number n−1 of engines not at rest.

With reference to FIG. 6, in a third strategy 104c, the processor unit 10 causes each engine that is not at rest to operate at a power equal to the difference between the necessary power $W_{nec}$ and the electrical power $W_{elec}$ generated by the electrical member divided by the second number n−1 of engines not at rest.

In addition, the processor unit causes the electrical member to operate in motor mode at an electrical power $W_{elec}$ equal to the product of the necessary power multiplied by a correction term in application of the following relationship, this product being bounded by a lower bound equal to said maximum power, i.e.:

$$W_{elec} = \min[W_{nec} \cdot (1 - Ck_{target}/Ck_{n-1}); W_{elec\_max}]$$

where "$W_{elec}$" represents the power developed by the electrical member, "$W_{nec}$" represents the necessary power, "1-Ck$_{target}$/CK$_{n-1}$" represents the correction term, "Ck$_{target}$" represents a predetermined target fuel consumption per kilometer, "Ck$_{n-1}$" represents fuel consumption per kilometer corresponding to the consumption per kilometer obtained with one engine at rest and with the engines not at rest supplying the necessary power when the necessary power is less than the threshold power, or supplying the threshold power when the necessary power is greater than or equal to the threshold power, "W$_{elec\_max}$" represents the maximum power, and "min" represents the minimum of the two expressions contained in the square brackets and separated by a semicolon.

It should be observed that a pilot may select the strategy to be applied with the help of strategy selection means 31, if any.

Independently of the implementation, and with reference to FIG. 4, if the level of electric charge SOC is less than or equal to the minimum threshold SOC$_{mini}$, the processor unit will require the storage means 5 to be charged.

Firstly, the processor unit 10 determines whether the necessary power W$_{nec}$ is equal to the threshold power MCP$_{n-1}$.

If so, the processor unit 10 causes all of the engines 6 to operate during an initial recharging stage 106 of the first configuration. The processor unit 10 thus electrically recharges the storage means 5 by running all of the engines, each engine 6 developing power equal to the sum of the necessary power W$_{nec}$ plus a charging power W$_{charge}$ divided by the first number, the charging power W$_{charge}$ being equal to the difference between the optimum power MCP$_n$ and the necessary power W$_{nec}$, this difference being bounded by a lower bound equal to the maximum power, i.e.:

$$W_{charge}=\min[MCP_n-W_{nec}; W_{elec\_max}]$$

where "W$_{charge}$" represents the charging power, "W$_{nec}$" represents the necessary power, "MCP$_n$" represents the optimum power, "W$_{elec\_max}$" represents the maximum power, and "min" represents the minimum of the two expressions contained in the square brackets and separated by a semicolon.

Once the storage means are charged, the processor unit applies the appropriate strategy 104.

If the necessary power W$_{nec}$ is strictly less than the threshold power MCP$_{n-1}$, during a second recharging stage 107 of the first configuration, the processor unit 10 recharges the storage means 5 electrically while resting one of the engines 6 and causing the second number n−1 of engines not at rest to operate. Each engine that is not at rest then develops power equal to the secondary sum of the necessary power plus a charging power divided by the second number, the charging power being equal to the difference between the threshold power developed by the second number of engines each operating at the continuous power and the necessary power, this difference being bounded by a lower bound equal to the maximum power, i.e.:

$$W_{charge}=\min[MCP_{n-1}-W_{nec}; W_{elec\_max}]$$

where "W$_{charge}$" represents the charging power, "W$_{nec}$" represents the necessary power, "MCP$_{n-1}$" represents the threshold power, "W$_{elec\_max}$" represents the maximum power, and "min" represents the minimum of the two expressions contained in the square brackets and separated by a semicolon.

When the storage means are charged, the processor unit applies the appropriate strategy 104.

Consequently, depending on the necessary power, either the first number n of engines 6 is used or else the second number n−1 of engines is used for driving the rotors and electrically recharging the storage means, the electrical member operating in electricity generator mode.

In the first configuration CONF1, the main condition is satisfied independently of the level of charge in the storage means. The processor unit will then put one of the engines to rest so long as the first secondary condition and the second secondary condition are both satisfied.

In the second configuration CONF2, the main condition is satisfied so long as the first secondary condition and the second secondary condition are satisfied.

Thus, when the level of electric charge SOC is greater than a minimum threshold SOC$_{mini}$, an option 108 is implemented seeking to rest one of the engines 6.

With reference to FIGS. 4 and 5, in a first option 108a' implemented in the first and second implementations, the processor unit 10 accelerates each engine that is not at rest so that together the engines develop the continuous power MCP.

Furthermore, the electrical member is operated in motor mode to deliver power equal to the difference between the necessary power W$_{nec}$ and a thermal power $\Sigma_{n-1}W_{ENG}$, said thermal power $\Sigma_{n-1}W_{ENG}$ being equal to the power developed together by said engines that are not at rest.

With reference to FIG. 6, in a second option 108b', implemented in the third implementation, the electrical member is caused by the processor unit to operate in motor mode to deliver electrical power W$_{elec}$, each engine that is not at rest is accelerated so that it supplies individually power equal to the necessary power minus the electrical power divided by the second number, the electrical power being equal to the product of the necessary power multiplied by a correction term in accordance with the following relationship, this product being bounded by a lower bound equal to said maximum power, i.e.:

$$W_{elec}=\min[W_{nec}\cdot(1-Ck_{target}/Ck_{n-1}); W_{elec\_max}]$$

where "W$_{elec}$" represents the power developed by the electrical member, "W$_{nec}$" represents the necessary power, "1−Ck$_{target}$/CK$_{n-1}$" represents said correction term, "Ck$_{target}$" represents a predetermined target fuel consumption per kilometer, "Ck$_{n-1}$" represents a fuel consumption per kilometer corresponding to the consumption per kilometer obtained with one engine at rest and with the engines that are not at rest supplying the necessary power when the necessary power is less than the threshold power, or supplying the threshold power when the necessary power is greater than or equal to the threshold power, "W$_{elec\_max}$" represents the maximum power, and "min" represents the minimum of the two expressions contained in the square brackets and separated by a semicolon.

Independently of the implementation, when the storage means are discharged, the processor unit implements a recharging stage 109 of the second configuration.

Thus, when the storage means contain a level of electric charge below a minimum threshold, the storage means are recharged electrically by running all of the engines.

Each engine then develops power W$_{ENG}$ equal to the sum of the necessary power plus a charging power divided by the first number, the charging power being equal to the difference between an optimum power developed by the first number n of engines each operating at the continuous power and the necessary power, this difference being bounded by a lower bound equal to the maximum power, i.e.:

$$W_{charge}=\min[MCP_n-W_{nec}; W_{elec\_max}]$$

where "W$_{charge}$" represents the charging power, "W$_{nec}$" represents the necessary power, "MCP$_n$" represents the optimum power, "W$_{elec\_max}$" represents the maximum power, and "min" represents the minimum of the two expressions contained in the square brackets and separated by a semicolon.

Furthermore, it should be observed that during the second configuration CONF2, when the first secondary condition is satisfied, if the second secondary condition is not satisfied, then the recharging stage 109 of the second configuration is implemented.

As soon as the storage means are charged, the processor unit applies the appropriate option 108. It should be observed that a pilot may select which option to apply with the help of option selection means 32, if any.

Consequently, during a flight it may be necessary in succession for an engine to be rested and then all of the engines to be used together. The processor unit may then determine which engine should be rested by applying a predetermined cycle as defined by the manufacturer.

By way of example, if an aircraft has a left engine and a right engine, the left engine is rested and then the right engine, and so on.

In the third configuration CONF3, during a decision step, the processor unit evaluates a requirement whereby the necessary power is less than the optimum power developed by the first number of engines each operating at the continuous power.

When this requirement is satisfied, or when the requirement is not satisfied while the storage means contain electric charge greater than a minimum threshold, the processor unit does not make use of the electrical member. During a step 111, each engine is then controlled to develop power equal to the quotient of the necessary power divided by the first number.

In contrast, when the requirement is not satisfied and the storage means contain electric charge less than or equal to a minimum threshold, then during a step 112, the processor unit 10 makes use of the electrical member in electricity generator mode.

Each engine develops power equal to the sum of the necessary power plus a charging power divided by the first number, the charging power being equal to the difference between an optimum power developed by the first number of engines each operating at the continuous power and the necessary power, said difference being bounded by a lower bound equal to the maximum power, i.e.:

$$W_{charge} = \min[MCP_n - W_{nec}; W_{elec\_max}]$$

where "$W_{charge}$" represents the charging power, "$W_{nec}$" represents the necessary power, "$MCP_n$" represents the optimum power developed by all of the engines operating at the first power, "$W_{elec\_max}$" represents the maximum power, and "min" represents the minimum of the two expressions contained in the square brackets and separated by a semicolon.

It should be observed that a pilot may optionally use inhibit means 33 for preventing the method of the invention being applied.

Similarly, it is possible to envisage inhibiting the method automatically during certain stages of flight, e.g. while hovering.

Naturally, the present invention may be subjected to numerous variations as to its implementation. Although several implementations are described, it will readily be understood that it is not conceivable to identify exhaustively all possible implementations. It is naturally possible to replace any of the means desired by equivalent means without going beyond the ambit of the present invention.

It is also possible to dimension the energy storage means and the value of the minimum threshold $SOC_{mini}$ so as to be capable of benefiting from an additional supply of electrical power in the event of one of the engines being lost because of failure. Under such circumstances, it is possible to use the energy storage means below the minimum threshold $SOC_{mini}$ until all of the stored energy has been used up.

What is claimed is:

1. A method of controlling a group of engines of an aircraft developing a necessary power ($W_{nec}$) for driving a rotor, the group of engines being provided with at least one electrical member connected to electrical energy storage means and a first number (n) of fuel-burning engines greater than or equal to two, each engine of the group of engines being capable of developing a continuous power (MCP) without limitation on duration during a continuous rating, the electrical member being capable of developing a maximum power ($W_{elec\_max}$) in motor mode, wherein a non-transitory processor unit executes stored instructions for evaluating a main condition in which the group of engines can develop the necessary power while resting an engine, and when the main condition is satisfied, for:

resting a first engine of the group of engines, and accelerating a second number (n−1) of engines not at rest of the group of engines, the second number being equal to the first number (n) minus one in order to develop at most a threshold power with the group of engines, the threshold power ($MCP_{n-1}$) being reached when each engine of the second number of engines not at rest is developing the continuous power (MCP); and causing the at least one electrical member to operate in motor mode if the processor unit finds that the main condition is satisfied when causing the at least one electrical member to operate in motor mode simultaneously with the second number of engines, the at least one electrical member operating temporarily in electricity generator mode when the storage means are discharged.

2. A method according to claim 1, wherein the processor unit evaluates whether the aircraft is in a first configuration (CONF1) in which the necessary power is less than or equal to the threshold power, or in a second configuration (CONF2) in which the necessary power is greater than the threshold power but less than or equal to the sum of the maximum power plus the threshold power, or in a third configuration (CONF3) in which the necessary power is greater than the sum of the maximum power plus the threshold power, the main condition being satisfied if:

a first secondary condition in which the necessary power developed by the group of engines is less than or equal to the sum of the maximum power plus the threshold power is satisfied in the first and second configurations; and when the necessary power is greater than the threshold power, if a second secondary condition is satisfied that the storage means contain an amount of electrical charge greater than a minimum threshold.

3. A method according to claim 1, wherein each engine of the second number of engines not at rest develops the same power.

4. A method according to claim 1, wherein if the necessary power is less than or equal to the threshold power, when the first secondary condition is satisfied, a strategy is applied as selected from a list including at least one of the following strategies:

a) the electrical member is not used, each engine of the second number of engines not at rest being accelerated so that it individually supplies power equal to the necessary power divided by the second number;

b) the electrical member is operated in motor mode at the maximum power, each engine of the second number of engines not at rest individually developing power equal to the difference between the necessary power and the maximum power divided by the second number; and c) with each engine of the second number of engines not at rest individually developing power equal to the difference between the necessary power and the electrical power generated by the electrical member divided by the second number, the electrical member is caused to operate in motor mode at an electrical power equal to the minimum of the product of the necessary power multiplied by a correction term in accordance with the following relationship, and the maximum power:

$$W_{elec} = \min[W_{nec} \cdot (1 - Ck_{target}/Ck_{n-1}); W_{elec\_max}]$$

where "$W_{elec}$" represents the power developed by the electrical member, "$W_{nec}$" represents the necessary power, "$1-Ck_{target}/CK_{n-1}$" represents the correction term, "$Ck_{target}$" represents a predetermined target fuel consumption per kilometer, "$Ck_{n-1}$" represents a fuel consumption per kilometer corresponding to the consumption per kilometer obtained with the first engine and with the second number of engines not at rest supplying the necessary power when the necessary power is less than the threshold power, or supplying the threshold power when the necessary power is greater than or equal to the threshold power, "$W_{elec\_max}$" represents the maximum power, and "min" represents the minimum of the two expressions contained in the square brackets and separated by a semicolon.

5. A method according to claim 2, wherein in the first configuration, when the first secondary condition is satisfied while the second secondary condition is not satisfied, the processor unit executes stored instructions to cause the electrical member to operate in electrical generator mode so as to recharge the storage means electrically.

6. A method according to claim 5, wherein when the necessary power is equal to the threshold power, the storage means are recharged electrically by running all of the engines, each engine developing power equal to the sum of the necessary power plus a charging power divided by the first number, the charging power being equal to the minimum of the maximum power and the difference between an optimum power developed by the first number of engines each operating at the continuous power, and the necessary power, $$W_{charge} = \min[MCP_n - W_{nec}; W_{elec\_max}]$$

where "$W_{charge}$" represents the charging power, "$W_{nec}$" represents the necessary power, "$MCP_n$" represents the optimum power, "$W_{elec\_max}$" represents the maximum power, and "min" represents the minimum of the two expressions contained in the square brackets and separated by a semicolon.

7. A method according to claim 1, wherein when the necessary power is less than the threshold power, the storage means are recharged electrically while resting the first engine and running the second number of engines, each engine of the second number of engines not at rest developing power equal to the secondary sum of the necessary power plus a charging power divided by the second number, the charging power being equal to the minimum of the maximum power and the difference between the threshold power developed by the second number of engines each operating at the continuous power and the necessary power:

$$W_{charge} = \min[MCP_n - W_{nec}; W_{elec\_max}]$$

where "$W_{charge}$" represents the charging power, "$W_{nec}$" represents the necessary power, "$MCP_{n-1}$" represents the threshold power, "$W_{elec\_max}$" represents the maximum power, and "min" represents the minimum of the two expressions contained in the square brackets and separated by a semicolon.

8. A method according to claim 1, wherein if the necessary power is greater than the threshold power but less than or equal to the sum of the maximum power plus the threshold power, when the main condition is satisfied, an option is applied that is selected from a list including at least one of the following options:

a') each engine of the second number of engines not at rest is accelerated so that it develops individually the continuous power, the electric motor being operated in motor mode to supply power equal to the difference between the necessary power and a thermal power, the thermal power being equal to the power developed together by the second number of engines not at rest; and b') with the electric motor being used in motor mode to supply electrical power, each engine of the second number of engines not at rest is accelerated individually to supply power equal to the necessary power minus the electrical power divided by the second number, the electrical power being equal to the minimum between the maximum power and the product of the necessary power multiplied by a correction term in accordance with the following relationship:

$$W_{elec} = \min[W_{nec} \cdot (1 - Ck_{target}/Ck_{n-1}); W_{elec\_max}]$$

where "$W_{elec}$" represents developed the electrical member, "$W_{nec}$" represents the necessary power, "$1-Ck_{target}/CK_{n-1}$" represents the correction term, "$Ck_{target}$" represents a predetermined target fuel consumption per kilometer, "$Ck_{n-1}$" represents a fuel consumption per kilometer corresponding to the consumption per kilometer obtained with the first engine and with the second number of engines not at rest supplying the necessary power when the necessary power is less than the threshold power or supplying the threshold power when the necessary power is greater than or equal to the threshold power, "$W_{elec\_max}$" represents the maximum power, and "min" represents the minimum of the two expressions contained in the square brackets and separated by a semicolon.

9. A method according to claim 8, wherein when the storage means contain electrical charge below a minimum threshold, the storage means are recharged electrically by running all of the engines, each engine developing power equal to the sum of the necessary power plus a charging power divided by the first number, the charging power being equal to the minimum between the maximum power and the difference between an optimum power developed by the first number of engines each operating at continuous power and the required power, i.e.:

$$W_{charge} = \min[MCP_n - W_{nec}; W_{elec\_max}]$$

where "$W_{charge}$" represents the charging power, "$W_{nec}$" represents the necessary power, "$MCP_n$" represents the optimum power, "$W_{elec\_max}$" represents the maximum power, and "min" represents the minimum of the two expressions contained in the square brackets and separated by a semicolon.

10. A method according to claim 1, wherein if the necessary power is greater than the sum of the maximum power plus the threshold power, a requirement is evaluated in which the necessary power is less than the optimum power developed by the first number of engines each operating at the continuous power.

11. A method according to claim 10, wherein when the requirement is satisfied, or when the requirement is not satisfied and the storage means include an electric charge greater than a minimum threshold, the electrical member is not used, each engine being controlled to develop power equal to the quotient of the necessary power divided by the first number.

12. A method according to claim 10, wherein when the requirement is not satisfied and the storage means include an electric charge less than or equal to a minimum threshold, the electric member is used in electricity generator mode, each engine developing power equal to the sum of the necessary power plus a charging power divided by the first number, the charging power being equal to the minimum between the maximum power and the difference between an optimum power developed by the first number of engines each operating at the continuous power and the necessary power:

$$W_{charge} = \min[MCP_n - W_{nec}; W_{elec\_max}]$$

where "$W_{charge}$" represents the charging power, "$W_{nec}$" represents the necessary power, "$MCP_n$" represents the optimum power developed by all of the engines operating at the first power, "$W_{elec\_max}$" represents the maximum power, and "min" represents the minimum of the two expressions contained in the square brackets and separated by a semicolon.

13. A method according to claim 10, wherein in a flight requiring in succession an engine to be rested and then all of the engines to be used, which engine to rest is determined in application of a predetermined cycle.

14. A method according to claim 1, wherein in no engine is rested during hovering flight.

15. An aircraft having a group of engines developing a necessary power ($W_{nec}$) to drive a rotor, the group of engines being provided with at least one electrical member connected to electrical storage means and with a first number n of fuel burning engines greater than or equal to two, the electrical member being capable of developing a maximum power ($W_{elec\_max}$) in motor mode, wherein the aircraft includes a non-transitory processor unit connected to the engines and to the electrical member, the processor unit being connected to determination means for determining the necessary power, the processor unit executing stored instructions in order to implement resting a first engine of the group of engines, and accelerating a second number n−1 of engines not at rest of the group of engines, the second number being equal to the first number n minus one in order to develop at most a threshold power with the group of engines, the threshold power ($MCP_{n-1}$) being reached when each engine of the second number of engines not at rest is developing the continuous power (MCP); and causing the electrical member to operate in motor mode if the processor unit finds that the main condition is satisfied when causing the electrical member to operate in motor mode simultaneously with the second number of engines, the electrical member operating temporarily in electricity generator mode when the storage means are discharged.

16. An aircraft according to claim 15, including at least one piece of equipment to be selected from a selection comprising at least:

strategy selection means for selecting a strategy to be applied if the necessary power is less than or equal to a threshold power, when the main condition is satisfied that the group of engines can develop the necessary power while resting the first engine;

option selection means for selecting an option to be applied if the necessary power is greater than the threshold power but less than or equal to the sum of the maximum power and the threshold power, and if the main condition is satisfied;

tactical selection means for determining firstly which strategy to apply if the necessary power is less than or equal to the threshold power, and when the main condition is satisfied that the group of engines can develop the necessary power while resting the first engine, and secondly an option to be applied if the necessary power is greater than the threshold power but less than or equal to the sum of the maximum power plus the threshold power, and if the main condition is satisfied; and inhibit means for inhibiting resting the first engine.

17. A method of controlling a group of engines of an aircraft developing a necessary power ($W_{nec}$) for driving a rotor, the group of engines being provided with at least one electrical member connected to electrical energy storage means and a first number (n) of fuel-burning engines greater than or equal to two, each of the engines being capable of developing a continuous power (MCP) without limitation on duration during a continuous rating, the electrical member being capable of developing a maximum power ($W_{elec\_max}$) in motor mode, wherein a non-transitory processor unit executes stored instructions for evaluating a main condition in which the group of engines can develop the necessary power while resting a first engine of the group of engines, and when the main condition is satisfied, for:

resting the first engine, and accelerating a second number (n−1) of engines with each engine of the second number of engines developing the same power, the second number of engines comprising the engines of the group of engines not at rest, the second number being equal to the first number (n) minus one in order to develop at most a threshold power with the group of engines, the threshold power ($MCP_{n-1}$) being reached when each engine of the second number of engines not at rest is developing the continuous power (MCP); and causing the electrical member to operate in motor mode if the processor unit finds that the main condition is satisfied when causing the electrical member to operate in motor mode simultaneously with the second number of engines, the electrical member operating temporarily in electricity generator mode when the storage means are discharged.

18. A method according to claim 17, wherein the processor unit evaluates whether the aircraft is in a first configuration (CONF1) in which the necessary power is less than or equal to the threshold power, or in a second configuration (CONF2) in which the necessary power is greater than the threshold power but less than or equal to the sum of the maximum power plus the threshold power, or in a third configuration (CONF3) in which the necessary power is greater than the sum of the maximum power plus the threshold power, the main condition being satisfied if:

a first secondary condition in which the necessary power developed by the group of engines is less than or equal to the sum of the maximum power plus the threshold power is satisfied in the first and second configurations; and when the necessary power is greater than the threshold power, if a second secondary condition is satisfied that the storage means contain an amount of electrical charge greater than a minimum threshold.

19. A method according to claim 17, wherein if the necessary power is less than or equal to the threshold power, when the first secondary condition is satisfied, a strategy is applied as selected from a list including at least one of the following strategies:

a) the electrical member is not used, each engine of the second number of engines not at rest being accelerated so that it individually supplies power equal to the necessary power divided by the second number;

b) the electrical member is operated in motor mode at the maximum power, each engine of the second number of engines not at rest individually developing power equal to the difference between the necessary power and the maximum power divided by the second number; and c) with each engine of the second number of engines not at rest individually developing power equal to the difference between the necessary power and the electrical power generated by the electrical member divided by the second number, the electrical member is caused to operate in motor mode at an electrical power equal to the minimum of the product of the necessary power multiplied by a correction term in accordance with the following relationship, and the maximum power:

$$W_{elec} = \min[W_{nec} \cdot (1 - Ck_{target}/Ck_{n-1});\ W_{elec\_max}]$$

where "$W_{elec}$" represents the power developed by the electrical member, "$W_{nec}$" represents the necessary power, "$1 - Ck_{target}/CK_{n-1}$" represents the correction term, "$Ck_{target}$" represents a predetermined target fuel consumption per kilometer, "$Ck_{n-1}$" represents a fuel consumption per kilometer corresponding to the consumption per kilometer obtained with the first engine and with the second number of engines not at rest supplying the necessary power when the necessary power is less than the threshold power, or supplying the threshold power when the necessary power is greater than or equal to the threshold power, "$W_{elec\_max}$" represents the maximum power, and "min" represents the minimum of the two expressions contained in the square brackets and separated by a semicolon.

20. A method according to claim 18, wherein in the first configuration, when the first secondary condition is satisfied while the second secondary condition is not satisfied, the processor unit executes stored instructions to cause the electrical member to operate in electrical generator mode so as to recharge the storage means electrically.

* * * * *